UNITED STATES PATENT OFFICE.

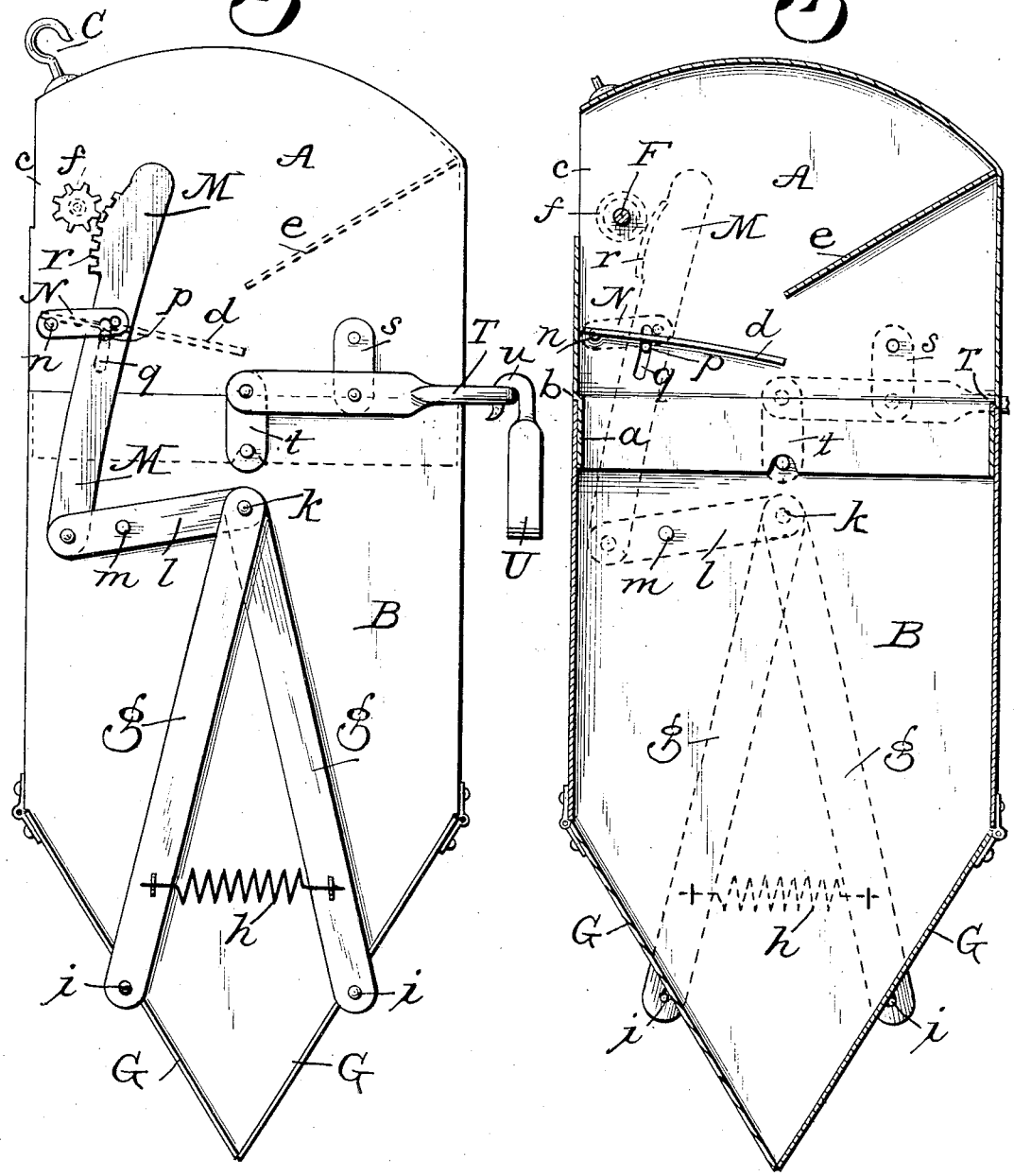

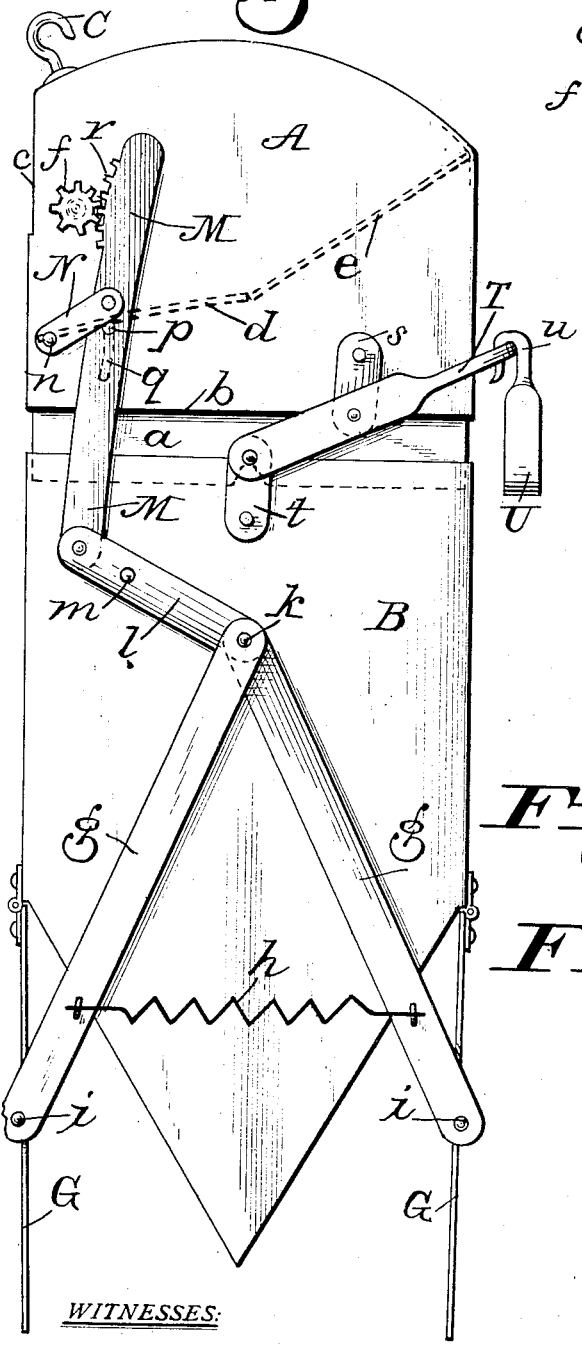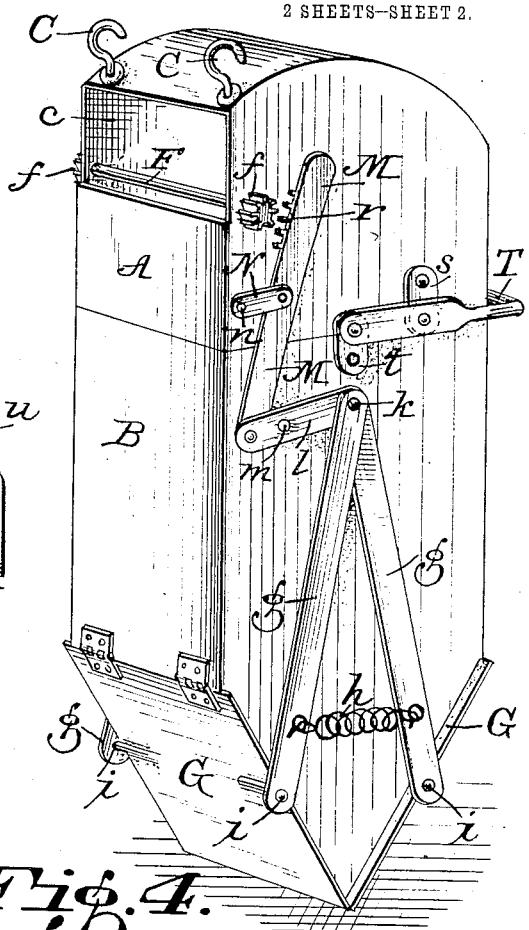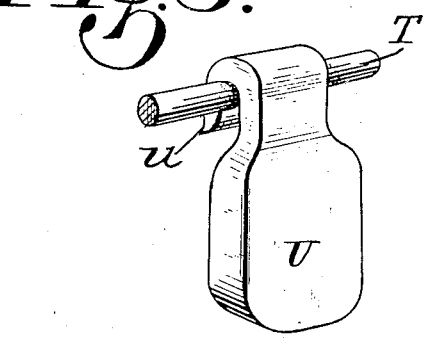

CORTLAND CUMMINS, OF DAYTON, OHIO.

AUTOMATIC CORN AND GRAIN WEIGHER.

1,122,482. Specification of Letters Patent. Patented Dec. 29, 1914.

Application filed July 30, 1913. Serial No. 781,917.

*To all whom it may concern:*

Be it known that I, CORTLAND CUMMINS, a citizen of the United States, residing at Dayton, in the county of Montgomery and State of Ohio, have invented certain new and useful Improvements in Automatic Corn and Grain Weighers, of which the following is a specification.

My invention relates to an "automatic corn and grain weigher."

While my automatic weighing device is more especially intended and designed for automatically weighing corn on the ear or cob,—after being husked or coming from the husking machine,—said device is also intended for automatically weighing loose corn when shucked or off the cob, as well as all other kinds of grain. It will be obvious and readily understood from the following description that if so desired, by simply constructing said device of a suitable size and making any slight and minor changes therein which may be found necessary; all within the spirit and scope of the invention; the device can also be used in like manner and with equal advantage for automatically weighing coal and various other articles.

My automatic weighing device is intended in practice, to be attached and suspended in any ordinary and suitable manner,—preferably by hooks,—from the conveyer of a corn husking or a grain threshing machine, or to a large grain storage elevator, when weighing said grain just before it is delivered to the chute of a car or wagon.

Some of the principal objects of this invention, consist in providing a device which will automatically weigh husked corn on the cob; shucked or loose corn off the cob or other grains, as loaded on the cars for transportation; thus taking the place of the ordinary, common and old style of hand scales now in use on all grain elevators. Also, to provide an automatic weighing device—as just referred to;—that is simple in construction; is composed of few parts; and one which can be manufactured at a small cost and therefore is inexpensive.

This invention consists essentially,—referring briefly and in general terms to the device embodying the same; of the very peculiar construction: arrangement and combination of the various parts or mechanical elements, and the minor details thereof; as will hereinafter be fully described in detail, and set forth in the subjoined claims all in accordance with the statutes in such cases made and provided therefor.

Referring to the accompanying drawings constituting a formal part of this specification, and illustrating one form of construction for carrying out the objects and principles of my invention, and wherein the same reference letters are utilized to indicate and point out the same parts wherever occurring throughout the several views:—Figure 1 is a side elevation of my automatic corn and grain weigher, showing the parts in the position they assume when receiving the corn or article about to be weighed; Fig. 2 is a vertical longitudinal sectional view—partially broken away—of the device as shown in Fig. 1; Fig. 3 is a side elevation of the device, showing the parts in the position they assume when in the act of weighing; Fig. 4 is a perspective view of the device, as shown in Fig. 1; and Fig. 5 is a perspective view of one of the weights and a broken away portion of the weighing-arm—in detail.

In describing my said invention specifically, and referring in detail to the various parts or mechanical features of construction, which combine to make up my automatic corn and grain weigher as shown throughout the several views of the drawings and pointed out therein by means of the characters of reference, as aforesaid: A and B refer respectively, to an upper and lower section forming the hollow body or shell of the device,—which is preferably constructed out of sheet metal of a suitable grade:—said sections being so connected, that when the device is operated, said lower section will be permitted to have a vertical movement from the position shown in Figs. 1, 2 and 4; to the position shown in Fig. 3, by means of a flange $a$ and a shoulder $b$ formed on the upper-section A, said flange telescoping or slipping within lower-section B while said shoulder forms a bearing or stop for said lower section as shown. Said upper-section—which is covered or closed at the top;—is opened at the bottom where it connects with the open top of said lower-section. The top of said upper-section is provided with hooks C,—as more fully shown in Fig. 4,—which are intended in practice to engage suitably arranged eyes projecting from the storage elevator or other supply receptacle, for supporting the weigher in a free and suspended position; or if so desired, instead of hooks and eyes any other suitable supporting means may be employed.

Upper-section A is formed at its front with a mouth or inlet opening $c$, which receives the husked corn on the cob or ear; or the loose corn from the cob, or any other grain to be weighed; as it passes from any form of conveyer suitable for the purpose intended and connected with the storage elevator or other supply receptacle, through said mouth, over and through the opening or passage left between the movable portion $d$ and the immovable or stationary portion $e$ forming the cut-off;—(which is now in its open or normal position when the sections are together as shown in Figs. 1, 2 and 4;)—down into the interior of lower-section B of the hollow body of the weigher. On each side of upper-section A, (see solid lines Figs. 1, 3 and 4; and dotted lines Fig. 2;) is located a pinion or small gear wheel $f$, one of which is mounted upon each end of shaft F; said ends are each revolubly journaled in and project through the sides of said section far enough to receive said pinions, which in practice are operated by means of a similar pinion or gear wheel, the teeth of which are in mesh with the teeth of one of said pinions $f$; and suitably arranged near the conveyer on a corn husking or grain threshing machine, or on a large grain storage elevator, and operated by and getting its power from the driving mechanism of the device, whereby pinions $f$ and their shaft F will be constantly revolved, as is obvious and can readily be understood, and not necessary to be here shown as said device is no part of my invention. When a sufficient amount or quantity of said corn or grain has passed into the interior of lower-section B,—as heretofore clearly described, the parts being in their normal positions as shown in Figs. 1, 2 and 4;—until its weight will cause said lower section to drop or move vertically from said upper section, and said lower section and all the parts will now assume the positions so clearly and fully shown in Fig. 3, forcing the trap-doors G,—which are hinged at their tops to the front and rear portions of the device as shown;—to open or spread outward from their top to their meeting point at their lower edges, and with them the legs $g$, which are connected by a tension spring $h$; (there being one pair of said legs located on each of the sides of the lower-section;) and as the divided ends of each pair of said legs are movably connected by a pivot $i$—or otherwise hinged to trap-doors G;—while their upper ends are movably connected by a pivot $k$ to a lever $l$, which is fulcrumed at $m$ to the sides of said lower-section. To the opposite end of each lever $l$ is pivoted an arm M, to which in turn is pivoted a movable link N, said links having their opposite end pivoted at $n$ to the sides of upper-section A; said pivot being also connected to movable portion $d$ of the cut-off. Each arm M is connected by a pivot $p$ to the movable portion $d$ of the cut-off; while said pivots move in slots $q$ formed in the sides of the upper section; and as trap-doors G open and the corn or grain passes out into any suitable receptacle placed below said doors to receive it, the toothed segment $r$ formed on each of said arms, will now be brought into engagement or mesh with the teeth of pinions $f$ through the medium of links N; and at the same time, said arms will turn or swing movable portion $d$ upward until it meets immovable portion $e$: thus causing the cut off to close the space or passageway between said portions, and stopping the flow of corn or grain: see Fig. 3. When the toothed segment $r$ formed on each arm M, is brought into engagement with the teeth of pinions $f$,—as just described,—the constantly driven shaft F: which is constantly driven by means of the power from the corn-husking or grain-threshing machine, transmitted through its pinion to one of the pinions $f$, as hereinbefore fully described; and which is no part of my invention,—will revolve the pinions $f$, thus raising each segment $r$ and drawing upward the arms M, thereby causing trap-doors G, to be thrown open as lower section B descends, as fully shown in Fig. 3, and as heretofore fully referred to. In Figs. 1, 2 and 4, toothed segment $r$ is shown out of engagement with pinion $f$; while in Fig. 3, toothed segment $r$ is shown when in engagement with pinion $f$. Links $s$ and $t$ are pivoted to the sides of upper and lower sections A and B respectively, while their opposite ends are pivoted to the flat end portions of weighing arm T which extend around the rear, from one side to the other side of the device. Upon said arm is held by means of its hooked end $u$ the weight U; which may represent and be the equivalent of any number of pounds; according to the articles to be weighed and the capacity of the weigher. In this instance said weight is intended to represent 36 lbs. which is the weight of half a bushel of husked corn on the cob or ear. Simultaneously with the closing of the cut off, and the opening of the trap-doors and dropping of the lower-section as just described; weighing arm T and its weight U will be carried upward to the position shown in Fig. 3, thus balancing and offsetting the weight of said corn as it passes through the opened trap-doors thus indicating that the exact weight of said corn is 36 lbs. or one-half bushel. The interior of the weigher now being empty, weight U as well as the lower-section and all the parts, will again assume their normal or first positions as shown in Figs. 1, 2 and 4, and ready to again perform the operation of weighing. Tension springs $h$ having now contracted will bring legs $g$ back to their normal positions thereby closing the trap-doors. When the device is empty and suspended from hooks C, weight U will properly balance said device.

From the foregoing description it will be readily understood that I have produced an automatic weighing device that is simple and inexpensive, and one which is very efficient in its results.

Having now described my automatic corn and grain weigher—in connection with the illustrations,—as new and as my invention—I claim:—

1. In an automatic corn and grain weigher the combination of an upper and lower section forming a hollow body; a mouth and cut-off located in said upper-section; trap-doors covering an outlet from said lower-section; a weighing-arm connected to said sections upon which is detachably mounted a weight; and means connected to said upper and lower sections for operating said cut-off and said trap-doors when said lower section descends; substantially as described.

2. An automatic corn and grain weigher comprising,—an upper and a lower section having a movable and telescopic connection; said upper section having an inlet, and provided with a cut-off and pinions; said lower section having an outlet and trap-doors adapted to open and close said outlet; a weighing-arm upon which is detachably mounted a weight, said arm being movably connected to said upper and lower sections, and arms connected with said upper and lower sections, each having a toothed segment adapted to engage said pinions and be drawn upward by the rotation of said pinions during the opening of said trap-doors; and means connected to said upper and lower sections for operating said pinions, said cut-off, and said trap-doors; all substantially in the manner and for the purposes described.

3. A device for automatically weighing corn and grain, consisting of a hollow body formed by an upper and a lower section; the upper section provided with a mouth, a cut-off and pinions; the lower section provided with an outlet having trap-doors adapted to open and close said outlet, legs movably connected to said trap-doors, levers connected to said legs, arms connected to said levers and having toothed segments adapted to engage and disengage said pinions and be drawn upward by the rotation of said pinions during the opening of said trap-doors while said lower section descends; and an arm and weight swung from said sections; all substantially as described.

In testimony whereof I affix my signature in presence of two witnesses.

CORTLAND CUMMINS.

Witnesses:
 ALLEN C. McDONALD,
 LEVI ALONZO WAYMIRF